United States Patent [19]

Vernon

[11] 4,131,962

[45] * Jan. 2, 1979

[54] RIBBED INNER SHELL FOR A HULL OF A CATAMARAN

[76] Inventor: Eugene G. Vernon, 2622 Crestview Dr., Newport Beach, Calif. 92105

[*] Notice: The portion of the term of this patent subsequent to Jun. 13, 1995, has been disclaimed.

[21] Appl. No.: 794,723

[22] Filed: May 9, 1977

[51] Int. Cl.² ............................................. B63B 3/00
[52] U.S. Cl. ........................................................ 9/6 P
[58] Field of Search ................... 9/6 R, 6 P, 6 W, 6.5, 9/1.4; 114/88, 85, 266, 267

[56] References Cited

U.S. PATENT DOCUMENTS

| | | | |
|---|---|---|---|
| 2,816,298 | 12/1957 | Foster | 9/6 P |
| 3,093,847 | 6/1963 | Strecker | 9/6 P |

FOREIGN PATENT DOCUMENTS 1127741  4/1962  Fed. Rep. of Germany ............... 9/6 P Primary Examiner—Trygve M. BLix
Assistant Examiner—Jesus D. Sotelo
Attorney, Agent, or Firm—W. Edward Johansen

[57] ABSTRACT

The invention is a molding process for forming a reinforced hull for a catamaran which has a first member which forms the first portion of the hull and which has a band adjacent to its peripheral edge that is indented to form a ledge and a second member which forms the second portion of the hull and which has its sidewall bent inwardly a slight amount adjacent to its peripheral edge in order that it may rest on the ledge. The reinforced hull has a sidewall which includes a first layer of fiberglass and polyester resin which forms the exterior surface of the sidewall for both the first member and the second member and a second layer of fiberglass and polyester resin which forms the interior surface of the sidewall. The second layer has a plurality of substantially parallel ribs running longitudinally along the hull with the ribs being formed from the second layer. The first layer is chemically joined to the second layer. The first and second members are joined together and glue is placed between the first and second member into the rib adjacent to the peripheral edge of the sidewall of the first member.

2 Claims, 4 Drawing Figures

RIBBED INNER SHELL FOR A HULL OF A CATAMARAN

BACKGROUND OF THE INVENTION

1. Field of the Invention

The present invention relates to the construction of hulls for a catamaran and more particularly to a molding process for reinforcing the hulls so that they are not only lightweight, but are also strong by using a set of internal ribs.

2. Description of the Prior Art

U.S. Pat. No. 3,971,837, entitled Process for Manufacturing a Composite Foamed Synthetic Resin Bowling Pin, issued to Tadashi Hasegawa on July 27, 1976, teaches a method of manufacturing a composite foamed synthetic resin bowling pin. The use of foam material to provide structural strength to a plastic body is presently in common use in many sporting apparatus including its use in reinforcing the fiberglass hulls of a small catamaran.

U.S. Pat. No. 2,816,298, entitled Boat Construction, issued to Joseph F. Foster on Dec. 17, 1957, teaches a hull which includes an outer skin and an inner shell and which also includes a corrugated filler sheet positioned between the inner shell and the outer skin.

U.S. Pat. No. 4,021,874, entitled Boat Hull, issued to Hobart L. Alter and Peter L. V. Hutchinson on May 10, 1977, teaches a boat hull which is fabricated from synthetic plastic sheets. The main deck of the hull is separately vacuum-formed. Plastic foam is adhered onto the interior surfaces of the sheets. The main body and hull are thereafter joined along the gunwale.

U.S. Pat. No. 3,811,141, entitled Boat Hull and Deck Assembly, issued to Helmut Stoeberl on May 21, 1974, teaches plastic boat hulls which are co-nected to the deck through nested inter-fitting tongue and groove joint configurations which are bonded together. U.S. Pat. No. 3,648,310, entitled Boat Structure, issued to Frank W. Butler on Mar. 14, 1972, teaches another boat structure which is useful in a dual hull boat arrangement and which has a pair of spaced hulls and a deck with a downwardly depending skirt which fits over the pair of spaced hulls.

The hulls of a catamaran are presently constructed in two pieces, one piece forming the top portion thereof and the other piece forming the bottom porion thereof. There is a mold for each piece. The molding process of each piece includes the steps of waxing the inner surface of the mold and coating the waxed surface with a polyester paint. The molding process also includes the steps of placing a layer of fiberglass and polyester resin onto the waxed and coated surface so that the layer will bond and cure to the coating of polyester paint, once the layer has bonded to the coating and has cured, placing a layer of foam material coated with a polyester resin on the layer of fiberglass and polyester resin, and pressing these two layer together by a vacuum technique. A vacuum system pulls the foam material against the inner surface of the layer of fiberglass and polyester resin. The molding process further includes the step of placing another layer of fiberglass and polyester resin onto the layer of foam material. Once this layer has bonded to the layer of foam material and has cured, the mold is removed and one of the portions of the hull is ready for assembly.

When both the top portion and the bottom portion of the hull have been formed they are joined together along their peripheral edges and secured by glue to each other. The joint formed where these two portions join is structurally weaker than the sidewalls of the hull because there is no continuity in the layer of foam material and there is no interlocking between the edges of the two portions of the hull. Furthermore the joint does not effect a smooth surface. In addition to the problem of structural weakness, there is another problem in that the peripheral edges of the two portions of the hull must be aligned in order to effect a joint that is a smooth as possible. This is a problem where the two portions of the hull are mass-produced each in one place and assemble in still another place. Both of these problems are results of the method used to mold each portion of the hull which produces a relatively thick sidewall and the method of joining the two portions of the hull which necessitates an alignment thereof.

The inventor has developed two methods for molding the portions of a hull for catamaran. The methods in and of themselves are useful in that each solves one of the above-mentioned problems.

SUMMARY OF THE INVENTION

In view of the foregoing factors and conditions characteristic of the prior art the primary object of the present invention is to provide a method for fabricating a reinforced hull for a catamaran which has sufficient structural strength where the two portions of the hull are joined.

It is another object of the present invention to provide a method for fabricating a hull for a catamaran which provides relatively thinner sidewalls than the method of the prior art.

It is still another object of the present invention to provide a method of fabricating a hull for a catamaran which eliminates the difficulty in aligning the peripheral edges of the two portions of the hull.

It is yet another object of the present invention to provide a method of fabricating a hull for a catamaran which provides more protection against leaking at the joint where the two portions of the hull are joined than the prior art method of fabricating a hull does.

In accordance with an embodiment of the present invention a reinforced hull for a catamaran which has a first member which forms the first portion of the hull and which has a band adjacent to its peripheral edge that is indented to form a ledge and a second member which forms the second portion of the hull and which has its sidewall bent inwardly a slight amount adjacent to its peripheral edge in order that it may rest on the ledge is described. The reinforced hull has a sidewall which includes a first layer of fiberglass and polyester resin which forms the exterior surface of the sidewall for both the first member and the second member and a second layer of fiberglass and polyester resin which forms the interior surface of the sidewall. The second layer has a plurality of substantially parallel ribs running longitudinally along the hull with the ribs being formed from the second layer. The first layer is chemically joined to the second layer. The first and second members are joined together and glue is placed between the first and second member into the rib adjacent to the peripheral edge of the first member.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
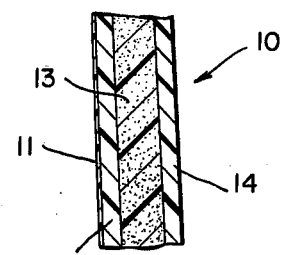
FIG. 1 is a partial cross-sectional view of the sidewall of a hull which has been constructed in accordance with the method of the prior art.

In order to best understand the present invention it is necessary to first understand the problem that the method of reinforcing a hull 10 for a catamaran that is presently being used. FIG. 1 is an enlarged partial cross-sectional of the hull 10 which has been constructed by the prior art method. The sidewall of the hull 10 has a coat 11 of polyester paint covering a first layer 12 of fiberglass and polyester resin, a layer 13 of foam material and a second layer 14 of fiberglass and polyester resin. The inventor has described the use of sidewalls of this type in an application that has been simultaneously filed with this present application and that is entitled A Method for Molding a Hull for a Catamaran by Eugene G. Vernon. In this invention the inventor has to remove a portion of the layer 13 of foam material at the joint where the top portion and bottom portion of the hull 10 are joined.

Figure 2:
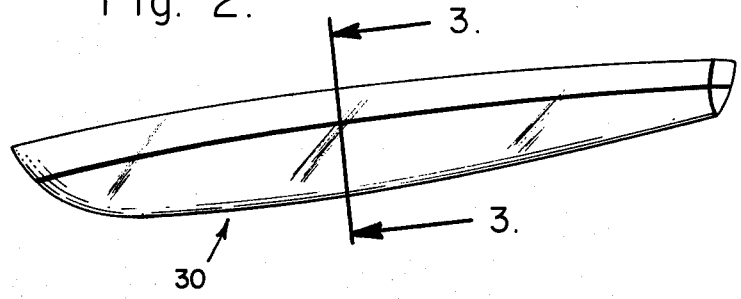
FIG. 2 is a perspective drawing of the hull of a catamaran which is constructed in accordance with the principles of the present invention.
Figure 3:
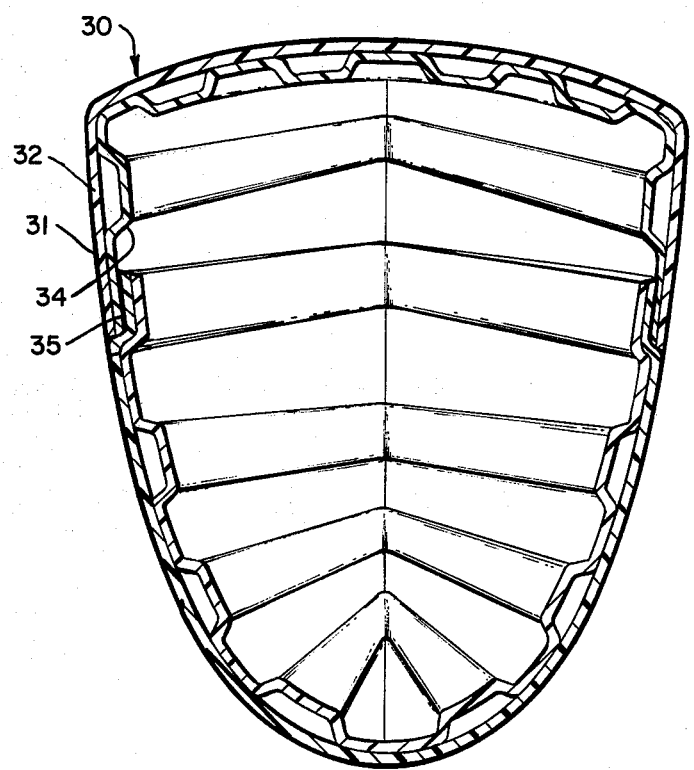
FIG. 3 is a cross-sectional view of the hull of FIG. 2 taken along line 3—3.

Referring to FIG. 2 a perspective view of a hull 30 of a catamaran is shown. Referring now to FIG. 3 the hull 30 has a coat 31 of polyester paint which covers its first layer 32 of polyester resin and fiberglass and a second layer 34 of fiberglass and polyester resin. The second layer 34 has a plurality of substantially parallel ribs running longitudinally along the hull 30. The use of the ribs is applicable for all two layer-hulls for boats, but it is particular useful in the application to the hull construction method of the inventor's other patent application.

The bottom portion of the hull 30 has a band adjacent to its peripheral edge that has its first layer 32 and its second layer 34 indented to form a ledge. The top portion of the hull 30 has a band also adjacent to its peripheral edge that has its first layer 32 bent slightly inward and its second layer 34 adjacent to itself so that when the top portion and the bottom portion are joined a polyester glue 35 may be placed in the rib member of the second layer of the bottom portion adjacent to the second layer 34 of the top portion of the hull 30 securing them together.

Figure 4:
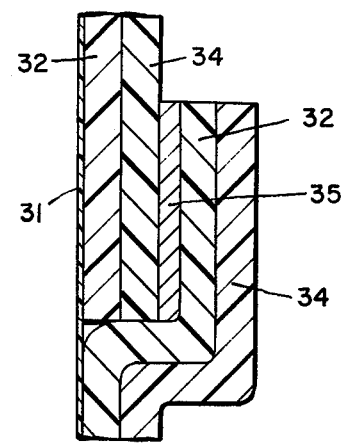
FIG. 4 is an enlarged partial cross-sectional view of the hull of FIG. 2.

Referring now to FIG. 4 an enlarged partial cross-sectional view of the sidewall of the hull 30 is shown. The sidewall has the coat 31 of polyester paint, the first layer 32 of fiberglass and polyester resin and the second layer 34 of fiberglass and polyester resin are chemically joined and is shown at the joint where the top and bottom portions of the hull 30 are joined.

The method of molding this particular hull 30 is to use a three piece mold and produce the top portion and the bottom portion with a ledge adjacent to the band formed by the third piece of the mold in conjunction with the second piece. The advantages of the present invention is that because the top portion and the bottom portion are joined together along their respective band adjacent to their peripheral edges the alignment of these peripheral edges is not as critical as it has been in the prior art method of fabricating these types of hulls. Furthermore the interlocking capabilities provided by by the ledge and the rib eliminates the necessity of the third member of the inventor's other patent which the inventor has already incorporated by reference herein. Additionally the large gluing surface provided by the band and the rib insures that the hull 30 will structurally strong at the joint where its top and bottom portions are joined.

From the foregoing it can be seen that a method for fabricating a reinforced hull for a catamaran that is not only structurally strong, but that is also adapted to be mass-produced because of its self-aligning capabilities has been described.

It should be noted that the schematics of the molding process and the hull are not drawn to scale and that distances of and between figures are not to be considered significant.

Accordingly, it is intended that the foregoing disclosure and showing made in the drawing shall be considered only as an illustration of the principles of the present invention.

What is claimed is:

1. A reinforced hull for a catamaran which has a first member which forms the first portion of the hull and which has a sidewall with a band adjacent to its peripheral edge that is indented to form a ledge and a second member which forms the second portion of the hull and which has a sidewall which is bent inwardly a slight amount adjacent to its peripheral edge in order that it may rest on the ledge, each of the sidewalls of said first member and said second member comprising:
   a. a first layer of fiberglass and polyester resin which forms the exterior surface of said sidewall for the first member and the second member; and
   b. a second layer of fiberglass and polyester resin which forms the interior surface of said sidewall, said second layer having a plurality of substantially parallel ribs running longitudinally along said hull with said ribs being formed from said layer and said second layer being chemically joined to said first layer in order to produce a ribbed interior surface for said hull.

2. A reinforced hull for a catamaran according to claim 1 wherein said sidewall of the first member is joined to said sidewall of the second member and secured thereto by glue which is placed within one of said ribs adjacent to the peripheral edge of said sidewall of the first member.

* * * * *